US012165656B2

(12) United States Patent
Breebaart et al.

(10) Patent No.: US 12,165,656 B2
(45) Date of Patent: Dec. 10, 2024

(54) ENCODING OF A MULTI-CHANNEL AUDIO SIGNAL TO GENERATE BINAURAL SIGNAL AND DECODING OF AN ENCODED BINAURALSIGNAL

(71) Applicant: KONINKLIJKE PHILIPS N.V., Eindhoven (NL)

(72) Inventors: Dirk Jeroen Breebaart, Eindhoven (NL); Erik Gosuinus Petrus Schuijers, Eindhoven (NL); Arnoldus Werner Johannes Domen, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 216 days.

(21) Appl. No.: 16/920,843

(22) Filed: Jul. 6, 2020

(65) Prior Publication Data

US 2020/0335115 A1 Oct. 22, 2020

Related U.S. Application Data

(63) Continuation of application No. 15/864,574, filed on Jan. 8, 2018, now Pat. No. 10,741,187, which is a (Continued)

(30) Foreign Application Priority Data

Feb. 21, 2006 (EP) .................................... 06110231
Mar. 7, 2006 (EP) .................................... 06110803
(Continued)

(51) Int. Cl.

| | |
|---|---|
| ***G10L 19/008*** | (2013.01) |
| ***H04S 3/00*** | (2006.01) |
| ***H04S 5/00*** | (2006.01) |

(52) U.S. Cl.

CPC ............ *G10L 19/008* (2013.01); *H04S 3/004* (2013.01); *H04S 5/005* (2013.01); *H04S 2400/01* (2013.01);
(Continued)

(58) Field of Classification Search

CPC ...................................................... G10L 19/008
See application file for complete search history.

(56) References Cited

U.S. PATENT DOCUMENTS 5,524,054 A 6/1996 Spille
5,946,352 A 8/1999 Rowlands
(Continued)

FOREIGN PATENT DOCUMENTS

JP 20056018 A 1/2005
JP 2005195983 A 7/2005
(Continued)

OTHER PUBLICATIONS

Fontaine, Yann, and Reihaneh Malekafzaliardakani. Study and Implementation of Binaural Cue Coding algorithm. Chalmers tekniska högskola, 2005. (Year: 2005).*
(Continued)

*Primary Examiner* — Jialong He

(57) ABSTRACT

An audio encoder comprises a multi-channel receiver which receives an M-channel audio signal where M>2. A down-mix processor down-mixes the M-channel audio signal to a first stereo signal and associated parametric data and a spatial processor modifies the first stereo signal to generate a second stereo signal in response to the associated parametric data and spatial parameter data for a binaural perceptual transfer function, such as a Head Related Transfer Function (HRTF). The second stereo signal is a binaural signal and may specifically be a (3D) virtual spatial signal. An output data stream comprising the encoded data and the
(Continued)

associated parametric data is generated by an encode processor and an output processor. The HRTF processing may allow the generation of a (3D) virtual spatial signal by conventional stereo decoders. A multi-channel decoder may reverse the process of the spatial processor to generate an improved quality multi-channel signal.

2 Claims, 8 Drawing Sheets

Related U.S. Application Data continuation of application No. 14/679,283, filed on Apr. 6, 2015, now Pat. No. 9,865,270, which is a continuation of application No. 12/279,856, filed as application No. PCT/IB2007/050473 on Feb. 13, 2007, now Pat. No. 9,009,057.

(30) Foreign Application Priority Data

Mar. 31, 2006 (EP) ..................................... 06112104
Aug. 29, 2006 (EP) ..................................... 06119670

(52) U.S. Cl.
CPC ....... *H04S 2420/01* (2013.01); *H04S 2420/03* (2013.01)

(56) References Cited

U.S. PATENT DOCUMENTS

| | | | |
|---|---|---|---|
| 6,122,619 | A | 9/2000 | Kolluru |
| 6,128,597 | A | 10/2000 | Kolluru |
| 6,882,733 | B2 | 4/2005 | Sato |
| 7,391,870 | B2 | 6/2008 | Herre |
| 7,447,317 | B2 | 11/2008 | Herre |
| 7,505,428 | B2 | 3/2009 | Kimura |
| 7,613,306 | B2 | 11/2009 | Miyasaka |
| 7,876,904 | B2 | 1/2011 | Ojala |
| 8,243,969 | B2 | 8/2012 | Breebaart |
| 8,654,983 | B2 | 2/2014 | Breebaart et al. |
| 2002/0055796 | A1 | 5/2002 | Katayama |
| 2003/0026441 | A1 | 2/2003 | Faller |
| 2004/0032960 | A1 | 2/2004 | Griesinger |
| 2005/0058278 | A1 | 3/2005 | Gallego et al. |
| 2005/0074127 | A1 | 4/2005 | Herre |
| 2005/0117759 | A1 | 6/2005 | Wu |
| 2005/0157883 | A1 | 7/2005 | Herre |
| 2005/0180579 | A1 | 8/2005 | Baumgarte |
| 2005/0195981 | A1 | 9/2005 | Faller |
| 2005/0226426 | A1 | 10/2005 | Oomen |
| 2005/0273322 | A1 | 12/2005 | Lee |
| 2005/0273324 | A1 | 12/2005 | Yi |
| 2005/0281408 | A1 | 12/2005 | Kim |
| 2006/0026441 | A1 | 2/2006 | Aaron |
| 2006/0045274 | A1 | 3/2006 | Aarts |
| 2006/0045294 | A1 | 3/2006 | Smyth |
| 2006/0083385 | A1 | 4/2006 | Allamanche |
| 2006/0106620 | A1 | 5/2006 | Thompson |
| 2006/0116886 | A1 | 6/2006 | Kim |
| 2006/0133618 | A1 | 6/2006 | Villemoes |
| 2006/0147047 | A1 | 7/2006 | Schuijers |
| 2006/0147048 | A1 | 7/2006 | Breebaart |
| 2006/0165184 | A1 | 7/2006 | Purnhagen |
| 2006/0233380 | A1 | 10/2006 | Holzer |
| 2007/0160219 | A1 | 7/2007 | Jakka |
| 2007/0183601 | A1 | 8/2007 | Van Loon |
| 2008/0052089 | A1 | 2/2008 | Takagi |
| 2011/0058679 | A1 | 3/2011 | Van Loon |

FOREIGN PATENT DOCUMENTS

| | | | |
|---|---|---|---|
| JP | 2005352396 | A | 12/2005 |
| JP | 2008537596 | A | 9/2008 |
| WO | 2005098826 | A1 | 10/2005 |
| WO | 2006011367 | A1 | 2/2006 |
| WO | 2007096808 | A1 | 8/2007 |

OTHER PUBLICATIONS

Welti, Todd, and Rene E. Jensen. "The Importance of Reflections in a Binaural Room Impulse Response." Audio Engineering Society Convention 114. Audio Engineering Society, 2003. (Year: 2003).*

Jakka, Julia. "Binaural to multichannel audio upmix." Helsinki University of Technology (2005). (Year: 2005).*

Johnston, James D., and Yin Hay Vicky Lam. "Perceptual soundfield reconstruction." Audio Engineering Society Convention 109. Audio Engineering Society, 2000. (Year: 2000).*

Breebaart et al, "The Perceptual (IR)Relevance of HRTF Magnitude and Phase Spectra", Audio Engineering Society, Convention Paper 5406, 110th Convention, Amsterdam NL, May 12-15, 2001, pp. 1-9.

Kulkarni et al, "Sensitivity of Human Subjects to Head-Related Transfer-Function Phase Spectra", Journal of Acoustical Society of America, vol. 105, No. 5, May 1999, pp. 2821-2840.

Wightman et al, "Headphone Simulation of Free-Filed Listening I:Stimulus Synthesis", Journal of Acoustical Society of America, vol. 85, No. 2, Feb. 1989, pp. 858-867.

Glasberg et al, "Derivation of Audiotry Filter Shapes From Notched-Noise Data", Hearing Research No. 47, 1990, pp. 103-138.

Herre et al, "The Reference Model Architecture for MPEG Spatial Audio Coding", Audio Engineering Society, 118th Convention, May 2005.

Breebaart et al, "MPEG Spatial Aduio Coding/MPEG Surround: Overview and Current Status", Audio Engineering Society, Convention Paper, Oct. 7-10, 2005, New York, NY, USA.

Faller et al, "Binaural Cue Coding-Part Ii: Schemes and Applications", IEEE Transactions on Speech and Audio Processing, vol. 11, No. 6, Nov. 2003.

Baumgarte et al, "Audio Coder Enhancement Using Scalable Binaural Cue Coding With Equalized Mixing", Audio Engineering Society Convention Opaper, May 8-11, 2004, Berlin, Germany.

* cited by examiner

ENCODING OF A MULTI-CHANNEL AUDIO SIGNAL TO GENERATE BINAURAL SIGNAL AND DECODING OF AN ENCODED BINAURALSIGNAL

The present invention claims, pursuant to 35 USC 120, as a Continuation, priority to and the benefit of the earlier filing date of that patent application entitled "Audio Encoding and Decoding," filed on Jan. 8, 2018 and afforded Ser. No. 15/864,574 which is a continuation of "Audio Encoding and Decoding" filed on Apr. 6, 2015 and afforded Ser. No. 14/679,283, which claimed pursuant to 35 USC 120, as a Continuation, priority to and the benefit of the earlier filing data of that patent application entitled "Audio Encoding and Decoding," filed on Aug. 19, 2008 and afforded Ser. No. 12/279,856, which claimed priority to the earlier filing date, as a National Stage filing of that patent application filed Feb. 13, 2007 and afforded serial number PCT/IB2007/050473, which claimed priority to EP0611023.5, filed on Feb. 2, 2006,
EP06110803.1 filed on Mar. 7, 2006,
EP06112104.2 filed on Mar. 31, 2006 and
EP06119670.5 filed on Aug. 29, 2006, the contents of all of which are incorporated in whole by reference, herein.

The invention relates to audio encoding and/or decoding and in particular, but not exclusively, to audio encoding and/or decoding involving a binaural virtual spatial signal.

Digital encoding of various source signals has become increasingly important over the last decades as digital signal representation and communication increasingly has replaced analogue representation and communication. For example, distribution of media content, such as video and music, is increasingly based on digital content encoding.

Furthermore, in the last decade there has been a trend towards multi-channel audio and specifically towards spatial audio extending beyond conventional stereo signals. For example, traditional stereo recordings only comprise two channels whereas modern advanced audio systems typically use five or six channels, as in the popular 5.1 surround sound systems. This provides for a more involved listening experience where the user may be surrounded by sound sources.

Various techniques and standards have been developed for communication of such multi-channel signals. For example, six discrete channels representing a 5.1 surround system may be transmitted in accordance with standards such as the Advanced Audio Coding (AAC) or Dolby Digital standards.

However, in order to provide backwards compatibility, it is known to down-mix the higher number of channels to a lower number and specifically it is frequently used to down-mix a 5.1 surround sound signal to a stereo signal allowing a stereo signal to be reproduced by legacy (stereo) decoders and a 5.1 signal by surround sound decoders.

One example is the MPEG2 backwards compatible coding method. A multi-channel signal is down-mixed into a stereo signal. Additional signals are encoded in the ancillary data portion allowing an MPEG2 multi-channel decoder to generate a representation of the multi-channel signal. An MPEG1 decoder will disregard the ancillary data and thus only decode the stereo down-mix. The main disadvantage of the coding method applied in MPEG2 is that the additional data rate required for the additional signals is in the same order of magnitude as the data rate required for coding the stereo signal. The additional bit rate for extending stereo to multi-channel audio is therefore significant.

Other existing methods for backwards-compatible multi-channel transmission without additional multi-channel information can typically be characterized as matrixed-surround methods. Examples of matrix surround sound encoding include methods such as Dolby Prologic II and Logic-7. The common principle of these methods is that they matrix-multiply the multiple channels of the input signal by a suitable non-quadratic matrix thereby generating an output signal with a lower number of channels. Specifically, a matrix encoder typically applies phase shifts to the surround channels prior to mixing them with the front and center channels.

Another reason for a channel conversion is coding efficiency. It has been found that e.g. surround sound audio signals can be encoded as stereo channel audio signals combined with a parameter bit stream describing the spatial properties of the audio signal. The decoder can reproduce the stereo audio signals with a very satisfactory degree of accuracy. In this way, substantial bit rate savings may be obtained.

There are several parameters which may be used to describe the spatial properties of audio signals. One such parameter is the inter-channel cross-correlation, such as the cross-correlation between the left channel and the right channel for stereo signals. Another parameter is the power ratio of the channels. In so-called (parametric) spatial audio (en)coders these and other parameters are extracted from the original audio signal so as to produce an audio signal having a reduced number of channels, for example only a single channel, plus a set of parameters describing the spatial properties of the original audio signal. In so-called (parametric) spatial audio decoders, the spatial properties as described by the transmitted spatial parameters are re-instated.

Such spatial audio coding preferably employs a cascaded or tree-based hierarchical structure comprising standard units in the encoder and the decoder. In the encoder, these standard units can be down-mixers combining channels into a lower number of channels such as 2-to-1, 3-to-1, 3-to-2, etc. down-mixers, while in the decoder corresponding standard units can be up-mixers splitting channels into a higher number of channels such as 1-to-2, 2-to-3 up-mixers.

3D sound source positioning is currently gaining interest, especially in the mobile domain. Music playback and sound effects in mobile games can add significant value to the consumer experience when positioned in 3D, effectively creating an 'out-of-head' 3D effect. Specifically, it is known to record and reproduce binaural audio signals which contain specific directional information to which the human ear is sensitive. Binaural recordings are typically made using two microphones mounted in a dummy human head, so that the recorded sound corresponds to the sound captured by the human ear and includes any influences due to the shape of the head and the ears. Binaural recordings differ from stereo (that is, stereophonic) recordings in that the reproduction of a binaural recording is generally intended for a headset or headphones, whereas a stereo recording is generally made for reproduction by loudspeakers. While a binaural recording allows a reproduction of all spatial information using only two channels, a stereo recording would not provide the same spatial perception. Regular dual channel (stereophonic) or multiple channel (e.g. 5.1) recordings may be transformed into binaural recordings by convolving each regular signal with a set of perceptual transfer functions. Such perceptual transfer functions model the influence of the human head, and possibly other objects, on the signal. A well-known type of spatial perceptual transfer function is the so-called Head-Related Transfer Function (HRTF). An alternative type of spatial perceptual transfer function, which also takes into account reflections caused by the walls, ceiling and floor of a room, is the Binaural Room Impulse Response (BRIR).

Typically, 3D positioning algorithms employ HRTFs, which describe the transfer from a certain sound source position to the eardrums by means of an impulse response. 3D sound source positioning can be applied to multi-channel signals by means of HRTFs thereby allowing a binaural signal to provide spatial sound information to a user for example using a pair of headphones.

It is known that the perception of elevation is predominantly facilitated by specific peaks and notches in the spectra arriving at both ears. On the other hand, the (perceived) azimuth of a sound source is captured in the 'binaural' cues, such as level differences and arrival-time differences between the signals at the eardrums. The perception of distance is mostly facilitated by the overall signal level and, in case of reverberant surroundings, by the ratio of direct and reverberant energy. In most cases it is assumed that especially in the late reverberation tail, there are no reliable sound source localization cues.

The perceptual cues for elevation, azimuth and distance can be captured by means of (pairs of) impulse responses; one impulse response to describe the transfer from a specific sound source position to the left ear; and one for the right ear. Hence the perceptual cues for elevation, azimuth, and distance are determined by the corresponding properties of the (pair of) HRTF impulse responses. In most cases, an HRTF pair is measured for a large set of sound source positions; typically with a spatial resolution of about 5 degrees in both elevation and azimuth.

Conventional binaural 3D synthesis comprises filtering (convolution) of an input signal with an HRTF pair for the desired sound source position. However, since HRTFs are typically measured in anechoic conditions, the perception of 'distance' or 'out-of-head' localization is often missing. Although convolution of a signal with anechoic HRTFs is not sufficient for 3D sound synthesis, the use of anechoic HRTFs is often preferable from a complexity and flexibility point of view. The effect of an echoic environment (required for creation of the perception of distance) can be added at a later stage, leaving some flexibility for the end user to modify the room acoustic properties. Moreover, since late reverberation is often assumed to be omni-directional (without directional cues), this method of processing is often more efficient than convolving every sound source with an echoic HRTF pair. Furthermore, besides complexity and flexibility arguments for room acoustics, the use of anechoic HRTFs has advantages for synthesis of the 'dry' (directional cue) signal as well.

Recent research in the field of 3D positioning has shown that the frequency resolution that is represented by the anechoic HRTF impulse responses is in many cases higher than necessary. Specifically, it seems that for both phase and magnitude spectra, a non-linear frequency resolution as proposed by the ERB scale is sufficient to synthesize 3D sound sources with an accuracy that is not perceptually different from processing with full anechoic HRTFs. In other words, anechoic HRTF spectra do not require a spectral resolution that is higher than the frequency resolution of the human auditory system.

A conventional binaural synthesis algorithm is outlined in FIG. 1. A set of input channels is filtered by a set of HRTFs. Each input signal is split in two signals (a left 'L', and a right 'R' component); each of these signals is subsequently filtered by an HRTF corresponding to the desired sound source position. All left-ear signals are subsequently summed to generate the left binaural output signal, and the right-ear signals are summed to generate the right binaural output signal.

The HRTF convolution can be performed in the time domain, but it is often preferred to perform the filtering as a product in the frequency domain. In that case, the summation can also be performed in the frequency domain.

Decoder systems are known that can receive a surround sound encoded signal and generate a surround sound experience from a binaural signal. For example, headphone systems allowing a surround sound signal to be converted to a surround sound binaural signal for providing a surround sound experience to the user of the headphones are known.

FIG. 2 illustrates a system wherein an MPEG surround decoder receives a stereo signal with spatial parametric data. The input bit stream is de-multiplexed resulting in spatial parameters and a down-mix bit stream. The latter bit stream is decoded using a conventional mono or stereo decoder. The decoded down-mix is decoded by a spatial decoder, which generates a multi-channel output based on the transmitted spatial parameters. Finally, the multi-channel output is then processed by a binaural synthesis stage (similar to that of FIG. 1) resulting in a binaural output signal providing a surround sound experience to the user.

However, such an approach has a number of associated disadvantages.

For example, the cascade of the surround sound decoder and the binaural synthesis includes the computation of a multi-channel signal representation as an intermediate step, followed by HRTF convolution and down-mixing in the binaural synthesis step. This may result in increased complexity and reduced performance.

Also, the system is very complex. For example spatial decoders typically operate in a sub-band (QMF) domain. HRTF convolution on the other hand can typically be implemented most efficiently in the FFT domain. Therefore, a cascade of a multi-channel QMF synthesis filter-bank, a multi-channel FFT transform, and a stereo inverse FFT transform is necessary, resulting in a system with high computational demands.

The quality of the provided user experience may be reduced. For example, coding artifacts created by the spatial decoder to create a multi-channel reconstruction will still be audible in the (stereo) binaural output.

Furthermore, the approach requires dedicated decoders and complex signal processing to be performed by the individual user devices. This may hinder the application in many situations. For example, legacy devices that are only capable of decoding the stereo down-mix will not be able to provide a surround sound user experience.

Hence, an improved audio encoding/decoding would be advantageous.

Accordingly, the invention seeks to preferably mitigate, alleviate or eliminate one or more of the above mentioned disadvantages singly or in any combination.

According to a first aspect of the invention there is provided an audio encoder comprising: means for receiving an M-channel audio signal where M>2; down-mixing means for down-mixing the M-channel audio signal to a first stereo signal and associated parametric data; generating means for modifying the first stereo signal to generate a second stereo signal in response to the associated parametric data and spatial parameter data for a binaural perceptual transfer function, the second stereo signal being a binaural signal; means for encoding the second stereo signal to generate encoded data; and output means for generating an output data stream comprising the encoded data and the associated parametric data.

The invention may allow improved audio encoding. In particular, the invention may allow an effective stereo encoding of multi-channel signals while allowing legacy stereo decoders to provide an enhanced spatial experience. Furthermore, the invention allows a binaural virtual spatial synthesis process to be reversed at the decoder thereby allowing high quality multi-channel decoding. The invention may allow a low complexity encoder and may in particular allow a low complexity generation of a binaural signal. The invention may allow facilitated implementation and reuse of functionality.

The invention may in particular provide a parametric based determination of a binaural virtual spatial signal from a multi-channel signal.

The binaural signal may specifically be a binaural virtual spatial signal such as a virtual 3D binaural stereo signal. The M-channel audio signal may be a surround signal such as a 5.1 or 7.1 surround signal. The binaural virtual spatial signal may emulate one sound source position for each channel of the M-channel audio signal. The spatial parameter data can comprise data indicative of a transfer function from an intended sound source position to the eardrum of an intended user.

The binaural perceptual transfer function may for example be a Head Related Transfer Function (HRTF) or a Binaural Room Impulse Response (BPIR).

According to an optional feature of the invention, the generating means is arranged to generate the second stereo signal by calculating sub band data values for the second stereo signal in response to the associated parametric data, the spatial parameter data and sub band data values for the first stereo signal.

This may allow improved encoding and/or facilitated implementation. Specifically, the feature may provide reduced complexity and/or a reduced computational burden. The frequency sub band intervals of the first stereo signal, the second stereo signal, the associated parametric data and the spatial parameter data may be different or some or all sub bands may be substantially identical for some or all of these.

According to an optional feature of the invention, the generating means is arranged to generate sub band values for a first sub band of the second stereo signal in response to a multiplication of corresponding stereo sub band values for the first stereo signal by a first sub band matrix; the generating means further comprising parameter means for determining data values of the first sub band matrix in response to associated parametric data and spatial parameter data for the first sub band.

This may allow improved encoding and/or facilitated implementation. Specifically, the feature may provide reduced complexity and/or reduced computational burden. The invention may in particular provide a parametric based determination of a binaural virtual spatial signal from a multi-channel signal by performing matrix operations on individual sub bands. The first sub band matrix values may reflect the combined effect of a cascading of a multi-channel decoding and HRTF/BRIR filtering of the resulting multi-channels. A sub band matrix multiplication may be performed for all sub bands of the second stereo signal.

According to an optional feature of the invention, the generating means further comprises means for converting a data value of at least one of the first stereo signal, the associated parametric data and the spatial parameter data associated with a sub band having a frequency interval different from the first sub band interval to a corresponding data value for the first sub band.

This may allow improved encoding and/or facilitated implementation. Specifically, the feature may provide reduced complexity and/or a reduced computational burden. Specifically, the invention may allow the different processes and algorithms to be based on sub band divisions most suitable for the individual process.

According to an optional feature of the invention, the generating means is arranged to determine the stereo sub band values $L_B$, $R_B$ for the first sub band of the second stereo signal substantially as:

$$\begin{bmatrix} L_B \\ R_B \end{bmatrix} = \begin{bmatrix} h_{11} & h_{12} \\ h_{21} & h_{22} \end{bmatrix} \begin{bmatrix} L_0 \\ R_0 \end{bmatrix},$$

wherein LO, RO are corresponding sub band values of the first stereo signal and the parameter means is arranged to determine data values of the multiplication matrix substantially as:

$$h_{11}=m_{11}H_L(L)+m_{21}H_L(R)+m_{31}H_L(C)$$

$$h_{11}=m_{11}H_L(L)+m_{22}H_L(R)+m_{32}H_L(C)$$

$$h_{21}=m_{11}H_R(L)+m_{21}H_R(R)+m_{31}H_R(C)$$

$$h_{22}=m_{12}H_R(L)+m_{22}H_R(R)+m_{32}H_R(C)$$

where mk,l are parameters determined in response to associated parametric data for a down-mix by the down-mixing means of channels L, R and C to the first stereo signal; and HJ(X) is determined in response to the spatial parameter data for channel X to stereo output channel J of the second stereo signal.

This may allow improved encoding and/or facilitated implementation. Specifically, the feature may provide reduced complexity and/or a reduced computational burden.

According to an optional feature of the invention, at least one of channels L and R correspond to a down-mix of at least two down-mixed channels and the parameter means is arranged to determine HJ(X) in response to a weighted combination of spatial parameter data for the at least two down-mixed channels.

This may allow improved encoding and/or facilitated implementation. Specifically, the feature may provide reduced complexity and/or a reduced computational burden.

According to an optional feature of the invention, the parameter means is arranged to determine a weighting of the spatial parameter data for the at least two down-mixed channels in response to a relative energy measure for the at least two down-mixed channels.

This may allow improved encoding and/or facilitated implementation. Specifically, the feature may provide reduced complexity and/or a reduced computational burden.

According to an optional feature of the invention, the spatial parameter data includes at least one parameter selected from the group consisting of: an average level per sub band parameter; an average arrival time parameter; a phase of at least one stereo channel; a timing parameter; a group delay parameter; a phase between stereo channels; and a cross channel correlation parameter.

These parameters may provide particularly advantageous encoding and may in particular be specifically suitable for sub band processing.

According to an optional feature of the invention, the output means is arranged to include sound source position data in the output stream.

This may allow a decoder to determine suitable spatial parameter data and/or may provide an efficient way of indicating the spatial parameter data with low overhead. This may provide an efficient way of reversing the binaural virtual spatial synthesis process at the decoder thereby allowing high quality multi-channel decoding. The feature may furthermore allow an improved user experience and may allow or facilitate implementation of a binaural virtual spatial signal with moving sound sources. The feature may alternatively or additionally allow a customization of a spatial synthesis at a decoder for example by first reversing the synthesis performed at the encoder followed by a synthesis using a customized or individualized binaural perceptual transfer function.

According to an optional feature of the invention, the output means is arranged to include at least some of the spatial parameter data in the output stream.

This may provide an efficient way of reversing the binaural virtual spatial synthesis process at the decoder thereby allowing high quality multi-channel decoding. The feature may furthermore allow an improved user experience and may allow or facilitate implementation of a binaural virtual spatial signal with moving sound sources. The spatial parameter data may be directly or indirectly included in the output stream, for example, by including information that allows a decoder to determine the spatial parameter data. The feature may alternatively or additionally allow a customization of a spatial synthesis at a decoder for example by first reversing the synthesis performed at the encoder followed by a synthesis using a customized or individualized binaural perceptual transfer function.

According to an optional feature of the invention, the encoder further comprises means for determining the spatial parameter data in response to desired sound signal positions.

This may allow improved encoding and/or facilitated implementation. The desired sound signal positions may correspond to the positions of the sound sources for the individual channels of the M-channel signal.

According to another aspect of the invention there is provided an audio decoder comprising: means for receiving input data comprising a first stereo signal and parametric data associated with a down-mixed stereo signal of an M-channel audio signal where M>2, the first stereo signal being a binaural signal corresponding to the M-channel audio signal; and generating means for modifying the first stereo signal to generate the down-mixed stereo signal in response to the parametric data and first spatial parameter data for a binaural perceptual transfer function, the first spatial parameter data being associated with the first stereo signal.

The invention may allow improved audio decoding. In particular, the invention may allow a high quality stereo decoding and may specifically allow an encoder binaural virtual spatial synthesis process to be reversed at the decoder. The invention may allow a low complexity decoder. The invention may allow facilitated implementation and reuse of functionality.

The binaural signal may specifically be binaural virtual spatial signal such as a virtual 3D binaural stereo signal. The spatial parameter data can comprise data indicative of a transfer function from an intended sound source position to the ear of an intended user. The binaural perceptual transfer function may for example be a Head Related Transfer Function (HRTF) or a Binaural Room Impulse Response (BPIR).

According to an optional feature of the invention, the audio decoder further comprises means for generating the M-channel audio signal in response to the down-mixed stereo signal and the parametric data.

The invention may allow improved audio decoding. In particular, the invention may allow a high quality multi-channel decoding and may specifically allow an encoder binaural virtual spatial synthesis process to be reversed at the decoder. The invention may allow a low complexity decoder. The invention may allow facilitated implementation and reuse of functionality.

The M-channel audio signal may be a surround signal such as a 5.1 or 7.1 surround signal. The binaural signal may be a virtual spatial signal which emulates one sound source position for each channel of the M-channel audio signal.

According to an optional feature of the invention, the generating means is arranged to generate the down-mixed stereo signal by calculating sub band data values for the down-mixed stereo signal in response to the associated parametric data, the spatial parameter data and sub band data values for the first stereo signal.

This may allow improved decoding and/or facilitated implementation. Specifically, the feature may provide reduced complexity and/or reduced computational burden. The frequency sub band intervals of the first stereo signal, the down-mixed stereo signal, the associated parametric data and the spatial parameter data may be different or some or all sub bands may be substantially identical for some or all of these.

According to an optional feature of the invention, the generating means is arranged to generate sub band values for a first sub band of the down-mixed stereo signal in response to a multiplication of corresponding stereo sub band values for the first stereo signal by a first sub band matrix;

the generating means further comprising parameter means for determining data values of the first sub band matrix in response to parametric data and spatial parameter data for the first sub band.

This may allow improved decoding and/or facilitated implementation. Specifically, the feature may provide reduced complexity and/or a reduced computational burden. The first sub band matrix values may reflect the combined effect of a cascading of a multi-channel decoding and HRTF/BRIR filtering of the resulting multi-channels. A sub band matrix multiplication may be performed for all sub bands of the down-mixed stereo signal.

According to an optional feature of the invention, the input data comprises at least some spatial parameter data.

This may provide an efficient way of reversing a binaural virtual spatial synthesis process performed at an encoder thereby allowing high quality multi-channel decoding. The feature may furthermore allow an improved user experience and may allow or facilitate implementation of a binaural virtual spatial signal with moving sound sources. The spatial parameter data may be directly or indirectly included in the input data e.g. it may be any information that allows the decoder to determine the spatial parameter data.

According to an optional feature of the invention, the input data comprises sound source position data and the decoder comprises means for determining the spatial parameter data in response to the sound source position data.

This may allow improved encoding and/or facilitated implementation. The desired sound signal positions may correspond to the positions of the sound sources for the individual channels of the M-channel signal.

The decoder may for example comprise a data store comprising HRTF spatial parameter data associated with different sound source positions and may determine the spatial parameter data to use by retrieving the parameter data for the indicated positions.

According to an optional feature of the invention, the audio decoder further comprises a spatial decoder unit for producing a pair of binaural output channels by modifying the first stereo signal in response to the associated parametric data and second spatial parameter data for a second binaural perceptual transfer function, the second spatial parameter data being different than the first spatial parameter data.

The feature may allow an improved spatial synthesis and may in particular allow an individual or customized spatial synthesized binaural signal which is particular suited for the specific user. This may be achieved while still allowing legacy stereo decoders to generate spatial binaural signals without requiring spatial synthesis in the decoder. Hence, an improved audio system can be achieved. The second binaural perceptual transfer function may specifically be different than the binaural perceptual transfer function of the first spatial data. The second binaural perceptual transfer function and the second spatial data may specifically be customized for the individual user of the decoder.

According to an optional feature of the invention, the spatial decoder comprises: a parameter conversion unit for converting the parametric data into binaural synthesis parameters using the second spatial parameter data, and a spatial synthesis unit for synthesizing the pair of binaural channels using the binaural synthesis parameters and the first stereo signal.

This may allow improved performance and/or facilitated implementation and/or reduced complexity. The binaural parameters may be parameters which may be multiplied with subband samples of the first stereo signal and/or the down-mixed stereo signal to generate subband samples for the binaural channels. The multiplication may for example be a matrix multiplication.

According to an optional feature of the invention, the binaural synthesis parameters comprise matrix coefficients for a 2 by 2 matrix relating stereo samples of the down-mixed stereo signal to stereo samples of the pair of binaural output channels.

This may allow improved performance and/or facilitated implementation and/or reduced complexity. The stereo samples may be stereo subband samples of e.g. QMF or Fourier transform frequency subbands.

According to an optional feature of the invention, the binaural synthesis parameters comprise matrix coefficients for a 2 by 2 matrix relating stereo subband samples of the first stereo signal to stereo samples of the pair of binaural output channels.

This may allow improved performance and/or facilitated implementation and/or reduced complexity. The stereo samples may be stereo subband samples of e.g. QMF or Fourier transform frequency subbands.

According to another aspect of the invention there is provided a method of audio encoding, the method comprising: receiving an M-channel audio signal where M>2; down-mixing the M-channel audio signal to a first stereo signal and associated parametric data; modifying the first stereo signal to generate a second stereo signal in response to the associated parametric data and spatial parameter data for a binaural perceptual transfer function, the second stereo signal being a binaural signal; encoding the second stereo signal to generate encoded data; and generating an output data stream comprising the encoded data and the associated parametric data.

According to another aspect of the invention there is provided a method of audio decoding, the method comprising:

receiving input data comprising a first stereo signal and parametric data associated with a down-mixed stereo signal of an M-channel audio signal where M>2, the first stereo signal being a binaural signal corresponding to the M-channel audio signal; and modifying the first stereo signal to generate the down-mixed stereo signal in response to the parametric data and spatial parameter data for a binaural perceptual transfer function, the spatial parameter data being associated with the first stereo signal.

According to another aspect of the invention there is provided a receiver for receiving an audio signal comprising: means for receiving input data comprising a first stereo signal and parametric data associated with a down-mixed stereo signal of an M-channel audio signal where M>2, the first stereo signal being a binaural signal corresponding to the M-channel audio signal; and generating means for modifying the first stereo signal to generate the down-mixed stereo signal in response to the parametric data and spatial parameter data for a binaural perceptual transfer function, the spatial parameter data being associated with the first stereo signal.

According to another aspect of the invention there is provided a transmitter for transmitting an output data stream; the transmitter comprising: means for receiving an M-channel audio signal where M>2; down-mixing means for down-mixing the M-channel audio signal to a first stereo signal and associated parametric data; generating means for modifying the first stereo signal to generate a second stereo signal in response to the associated parametric data and spatial parameter data for a binaural perceptual transfer function, the second stereo signal being a binaural signal; means for encoding the second stereo signal to generate encoded data; output means for generating an output data stream comprising the encoded data and the associated parametric data; and means for transmitting the output data stream.

According to another aspect of the invention there is provided a transmission system for transmitting an audio signal, the transmission system comprising: a transmitter comprising: means for receiving an M-channel audio signal where M>2, down-mixing means for down-mixing the M-channel audio signal to a first stereo signal and associated parametric data, generating means for modifying the first stereo signal to generate a second stereo signal in response to the associated parametric data and spatial parameter data for a binaural perceptual transfer function, the second stereo signal being a binaural signal, means for encoding the second stereo signal to generate encoded data, output means for generating an audio output data stream comprising the encoded data and the associated parametric data, and means for transmitting the audio output data stream; and a receiver comprising: means for receiving the audio output data stream; and means for modifying the second stereo signal to generate the first stereo signal in response to the parametric data and the spatial parameter data.

According to another aspect of the invention there is provided a method of receiving an audio signal, the method comprising: receiving input data comprising a first stereo signal and parametric data associated with a down-mixed stereo signal of an M-channel audio signal where M>2, the first stereo signal being a binaural signal corresponding to the M-channel audio signal; and modifying the first stereo signal to generate the down-mixed stereo signal in response to the parametric data and spatial parameter data for a binaural perceptual transfer function, the spatial parameter data being associated with the first stereo signal.

According to another aspect of the invention there is provided a method of transmitting an audio output data stream, the method comprising: receiving an M-channel audio signal where M>2; down-mixing the M-channel audio signal to a first stereo signal and associated parametric data; modifying the first stereo signal to generate a second stereo signal in response to the associated parametric data and spatial parameter data for a binaural perceptual transfer function, the second stereo signal being a binaural signal; encoding the second stereo signal to generate encoded data; and generating an audio output data stream comprising the encoded data and the associated parametric data; and transmitting the audio output data stream.

According to another aspect of the invention there is provided a method of transmitting and receiving an audio signal, the method comprising receiving an M-channel audio signal where M>2; down-mixing the M-channel audio signal to a first stereo signal and associated parametric data; modifying the first stereo signal to generate a second stereo signal in response to the associated parametric data and spatial parameter data for a binaural perceptual transfer function, the second stereo signal being a binaural signal; encoding the second stereo signal to generate encoded data; and generating an audio output data stream comprising the encoded data and the associated parametric data; transmitting the audio output data stream; receiving the audio output data stream; and modifying the second stereo signal to generate the first stereo signal in response to the parametric data and the spatial parameter data.

According to another aspect of the invention there is provided a computer program product for executing any of the above described methods.

According to another aspect of the invention there is provided an audio recording device comprising an encoder according to the above described encoder.

According to another aspect of the invention there is provided an audio playing device comprising a decoder according to the above described decoder.

According to another aspect of the invention there is provided an audio data stream for an audio signal comprising a first stereo signal; and parametric data associated with a down-mixed stereo signal of an M-channel audio signal where M>2; wherein the first stereo signal is a binaural signal corresponding to the M-channel audio signal.

According to another aspect of the invention there is provided a storage medium having stored thereon a signal as described above.

These and other aspects, features and advantages of the invention will be apparent from and elucidated with reference to the embodiment(s) described hereinafter.

Embodiments of the invention will be described, by way of example only, with reference to the drawings, in which FIG. 1 is an illustration of a binaural synthesis in accordance with the prior art;

Figure 3:
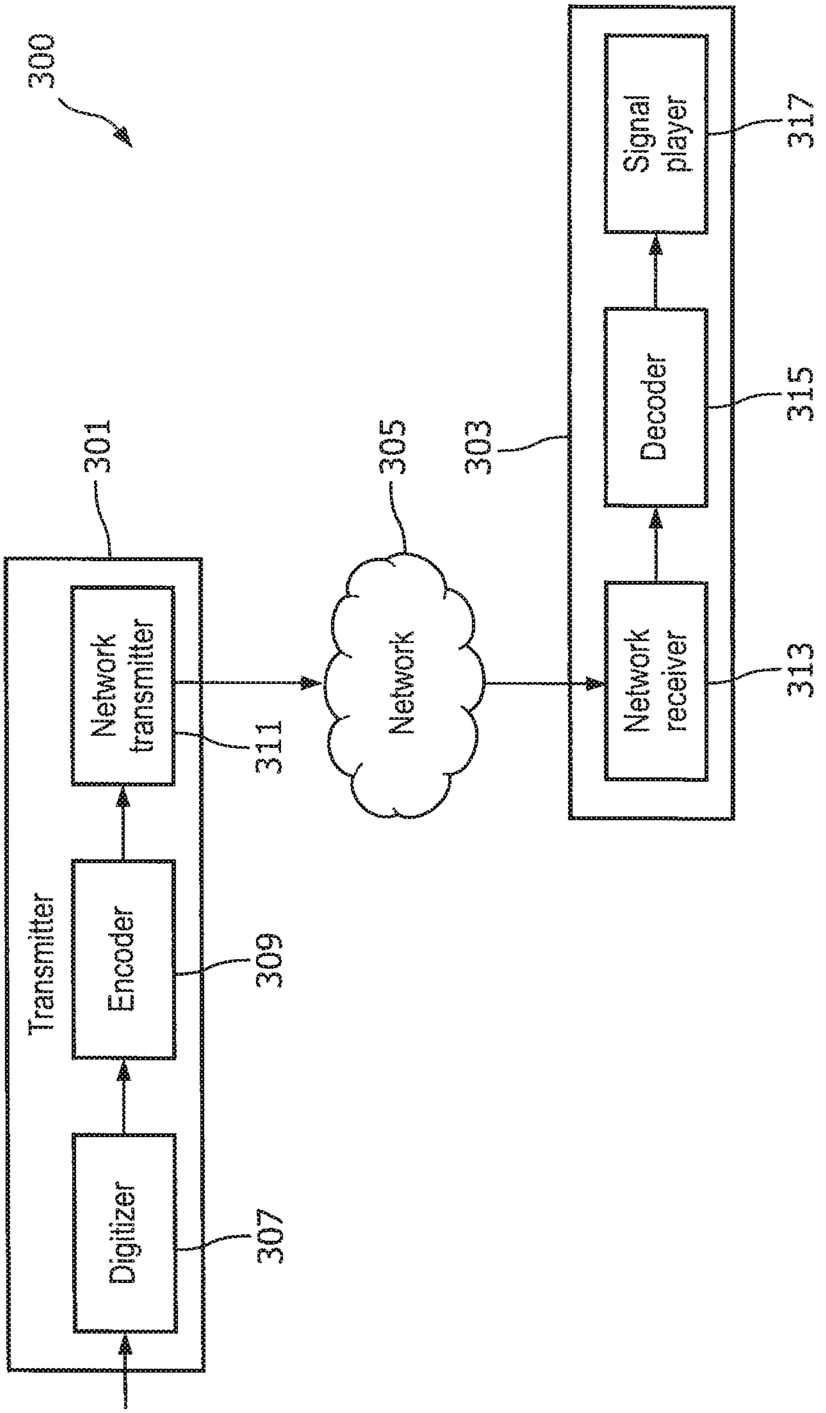
FIG. 3 illustrates a transmission system for communication of an audio signal in accordance with some embodiments of the invention.

FIG. 3 illustrates a transmission system 300 for communication of an audio signal in accordance with some embodiments of the invention. The transmission system 300 comprises a transmitter 301 which is coupled to a receiver 303 through a network 305 which specifically may be the Internet.

In the specific example, the transmitter 301 is a signal recording device and the receiver is a signal player device 303 but it will be appreciated that in other embodiments a transmitter and receiver may be used in other applications and for other purposes. For example, the transmitter 301 and/or the receiver 303 may be part of a transcoding functionality and may, for example, provide interfacing to other signal sources or destinations.

In the specific example where a signal recording function is supported, the transmitter 301 comprises a digitizer 307 which receives an analog signal that is converted to a digital PCM signal by sampling and analog-to-digital conversion. The digitizer 307 samples a plurality of signals thereby generating a multi-channel signal.

Figure 1:
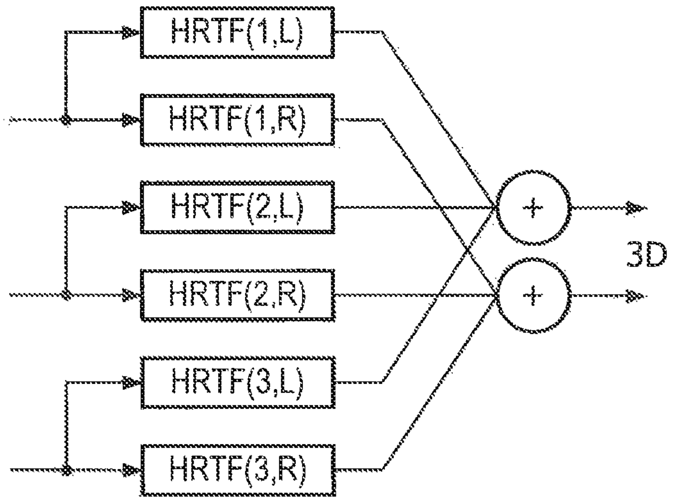
(Prior Art) FIG. 1
Figure 2:
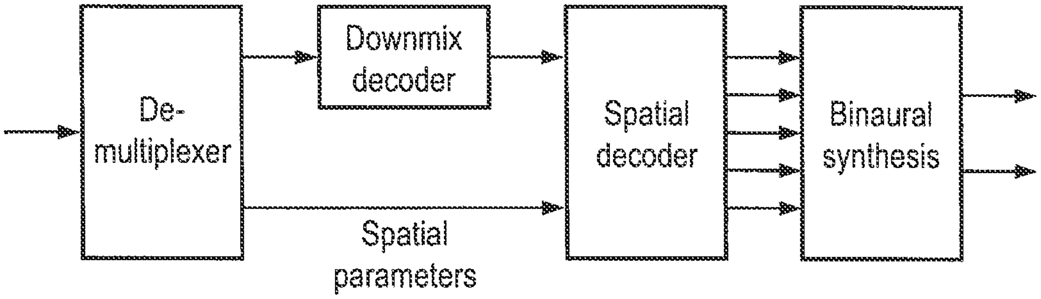
FIG. 2 (Prior Art)
FIG. 2 is an illustration of a cascade of a multi-channel decoder and a binaural synthesis.

The digitizer 307 is coupled to the encoder 309 of FIG. 1 which encodes the multi-channel signal in accordance with an encoding algorithm. The encoder 309 is coupled to a network transmitter 311 which receives the encoded signal and interfaces to the Internet 305. The network transmitter 311 may transmit the encoded signal to the receiver 303 through the Internet 305.

The receiver 303 comprises a network receiver 313 which interfaces to the Internet 305 and which is arranged to receive the encoded signal from the transmitter 301.

The network receiver 313 is coupled to a decoder 315. The decoder 315 receives the encoded signal and decodes it in accordance with a decoding algorithm.

In the specific example where a signal playing function is supported, the receiver 303 further comprises a signal player 317 which receives the decoded audio signal from the decoder 315 and presents this to the user. Specifically, the signal player 317 may comprise a digital-to-analog converter, amplifiers and speakers as required for outputting the decoded audio signal.

In the specific example, the encoder 309 receives a five channel surround sound signal and down-mixes this to a stereo signal. The stereo signal is then post-processed to generate a binaural signal which specifically is a binaural virtual spatial signal in the form of 3D binaural down-mix. By using a 3D post-processing stage working on the down-mix after spatial encoding, the 3D processing can be inverted in the decoder 315. As a result, a multi-channel decoder for loudspeaker playback will show no significant degradation in quality due to the modified stereo down-mix, while at the same time, even conventional stereo decoders will produce a 3D compatible signal. Thus, the encoder 309 may generate a signal that allows a high quality multi-channel decoding and at the same time allows a pseudo spatial experience from a traditional stereo output such as e.g. from a traditional decoder feeding a pair of headphones.

Figure 4:
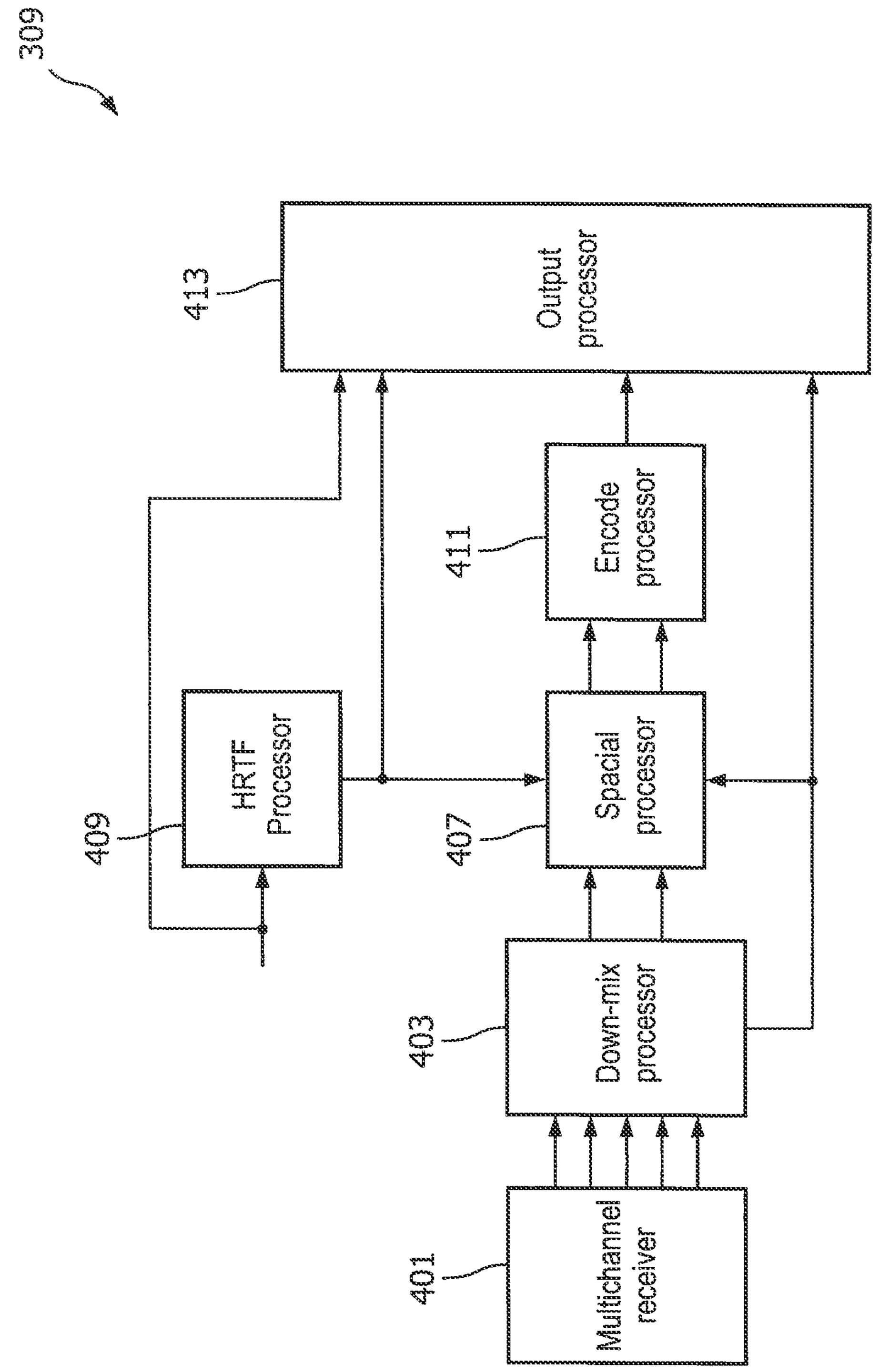
FIG. 4 illustrates an encoder in accordance with some embodiments of the invention.

FIG. 4 illustrates the encoder 309 in more detail.

The encoder 309 comprises a multi-channel receiver 401 which receives a multi-channel audio signal. Although the described principles will apply to a multi-channel signal comprising any number of channels above two, the specific example will focus on a five channel signal corresponding to a standard surround sound signal (for clarity and brevity the lower frequency channel frequently used for surround signals will be ignored. However it will be clear to the person skilled in the art that the multi-channel signal may have an additional low frequency channel. This channel may for example be combined with the Center channel by a down-mix processor).

The multi-channel receiver 401 is coupled to a down-mix processor 403 which is arranged to down-mix the five channel audio signal to a first stereo signal. In addition, the down-mix processor 403 generates parametric data 405 associated with the first stereo signal and containing audio cues and information relating the first stereo signal to the original channels of the multi-channel signal.

Figure 5:
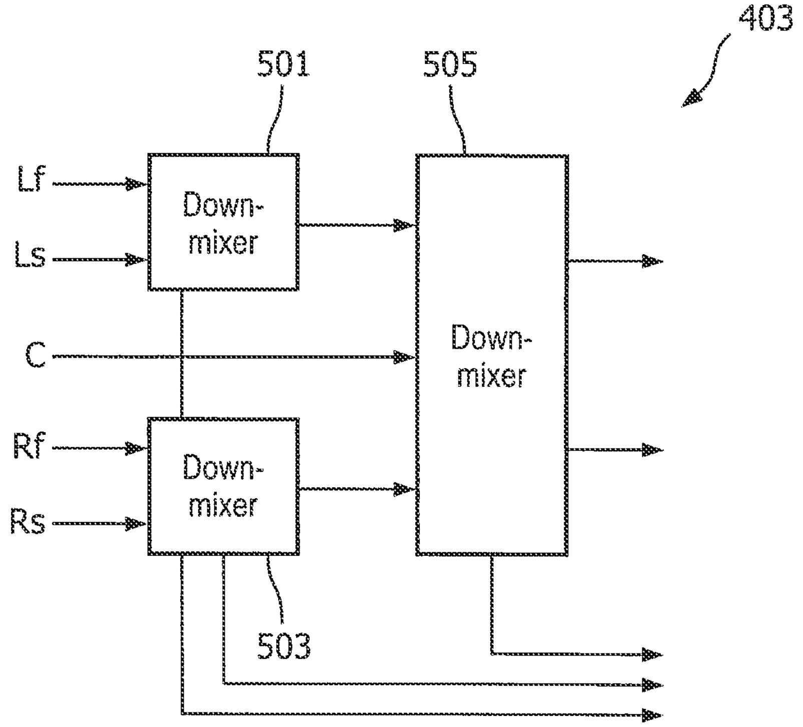
FIG. 5 illustrates a surround sound parametric down-mix encoder.

The down-mix processor 403 may for example implement an MPEG surround multi-channel encoder. An example of such is illustrated in FIG. 5. In the example, the multi-channel input signal consists of the Lf (Left Front), Ls (Left surround), C (Center), Rf (Right front) and Rs (Right surround) channels. The Lf and Ls channels are fed to a first TTO (Two To One) down-mixer 501 which generates a mono down-mix for a Left (L) channel as well as parameters relating the two input channels Lf and Ls to the output L channel. Similarly, the Rf and Rs channels are fed to a second TTO down-mixer 503 which generates a mono down-mix for a Right (R) channel as well as parameters relating the two input channels Rf and Rs to the output R channel. The R, L and C channels are then fed to a TTT (Three To Two) down-mixer 505 which combines these signals to generate a stereo down-mix and additional spatial parameters.

The parameters resulting from the TTT down-mixer 505 typically consist of a pair of prediction coefficients for each parameter band, or a pair of level differences to describe the energy ratios of the three input signals. The parameters of the TTO down-mixers 501, 503 typically consist of level differences and coherence or cross-correlation values between the input signals for each frequency band.

The generated first stereo signal is thus a standard conventional stereo signal comprising a number of down-mixed channels. A multi-channel decoder can recreate the original multi-channel signal by up-mixing and applying the associated parametric data. However, a standard stereo decoder will merely provide a stereo signal thereby losing spatial information and producing a reduced user experience.

However, in the encoder 309, the down-mixed stereo signal is not directly encoded and transmitted. Rather, the first stereo signal is fed to a spatial processor 407 which is also fed the associated parameter data 405 from the down-mix processor 403. The spatial processor 407 is furthermore coupled to an HRTF processor 409.

The HRTF processor 409 generates Head-Related Transfer Function (HRTF) parameter data used by the spatial processor 407 to generate a 3D binaural signal. Specifically, an HRTF describes the transfer function from a given sound source position to the eardrums by means of an impulse response. The HRTF processor 409 specifically generates HRTF parameter data corresponding to a value of a desired HRTF function in a frequency sub band. The HRTF processor 409 may for example calculate a HRTF for a sound source position of one of the channels of the multi-channel signal. This transfer function may be converted to a suitable frequency sub band domain (such as a QMF or FFT sub band domain) and the corresponding HRTF parameter value in each sub band may be determined.

It will be appreciated that although the description focuses on an application of Head-Related Transfer Functions, the described approach and principles apply equally well to other (spatial) binaural perceptual transfer functions, such as an Binaural Room Impulse Response (BRIR) function. Another example of a binaural perceptual transfer function is a simple amplitude panning rule which describes the relative amount of signal level from one input channel to each of the binaural stereo output channels.

In some embodiments, the HRTF parameters may be calculated dynamically whereas in other embodiments they may be predetermined and stored in a suitable data store. For example, the HRTF parameters may be stored in a database as a function of azimuth, elevation, distance and frequency band. The appropriate HRTF parameters for a given frequency sub band can then simply be retrieved by selecting the values for the desired spatial sound source position.

The spatial processor 407 modifies the first stereo signal to generate a second stereo signal in response to the associated parametric data and spatial HRTF parameter data. In contrast to the first stereo signal, the second stereo signal is a binaural virtual spatial signal and specifically a 3D binaural signal which when presented through a conventional stereo system (e.g. by a pair of headphones) can provide an enhanced spatial experience emulating the presence of more than two sound sources at different sound source positions.

The second stereo signal is fed to an encode processor 411 that is coupled to the spatial processor 407 and which encodes the second signal into a data stream suitable for transmission (e.g. applying suitable quantization levels etc). The encode processor 411 is coupled to an output processor 413 which generates an output stream by combining at least the encoded second stereo signal data and the associated parameter data 405 generated by the down-mix processor 403.

Typically HRTF synthesis requires waveforms for all individual sound sources (e.g. loudspeaker signals in the context of a surround sound signal). However, in the encoder 307, HRTF pairs are parameterized for frequency sub bands thereby allowing e.g. a virtual 5.1 loudspeaker setup to be generated by means of low complexity post-processing of the down-mix of the multi-channel input signal, with the help of the spatial parameters that were extracted during the encoding (and down-mixing) process.

The spatial processor may specifically operate in a sub band domain such as a QMF or FFT sub band domain. Rather than decoding the down-mixed first stereo signal to generate the original multi-channel signal followed by an HRTF synthesis using HRTF filtering, the spatial processor 407 generates parameter values for each sub band corresponding to the combined effect of decoding the down-mixed first stereo signal to a multi-channel signal followed by a re-encoding of the multi-channel signal as a 3D binaural signal.

Specifically, the inventors have realized that the 3D binaural signal can be generated by applying a 2×2 matrix multiplication to the sub band signal values of the first signal. The resulting signal values of the second signal correspond closely to the signal values that would be generated by a cascaded multi-channel decoding and HRTF synthesis. Thus, the combined signal processing of the multi-channel coding and HRTF synthesis can be combined into four parameter values (the matrix coefficients) that can simply be applied to the sub band signal values of the first signal to generate the desired sub band values of the second signal. Since the matrix parameter values reflect the combined process of decoding the multi-channel signal and the HRTF synthesis, the parameter values are determined in response to both the associated parametric data from the down-mix processor 403 as well as HRTF parameters.

In the encoder 309, the HRTF functions are parameterized for the individual frequency bands. The purpose of HRTF parameterization is to capture the most important cues for sound source localization from each HRTF pair. These parameters may include:

An (average) level per frequency sub band for the left-ear impulse response;

An (average) level per frequency sub band for the right-ear impulse response;

An (average) arrival time or phase difference between the left-ear and right-ear impulse response;

An (average) absolute phase or time (or group delay) per frequency sub band for both left and right-ear impulse responses (in this case, the time or phase difference becomes in most cases obsolete); and A cross-channel correlation or coherence per frequency sub band between corresponding impulse responses.

The level parameters per frequency sub band can facilitate both elevation synthesis (due to specific peaks and troughs in the spectrum) as well as level differences for azimuth (determined by the ratio of the level parameters for each band).

The absolute phase values or phase difference values can capture arrival time differences between both ears, which are also important cues for sound source azimuth. The coherence value might be added to simulate fine structure differences between both ears that cannot be contributed to level and/or phase differences averaged per (parameter) band.

Figure 6:
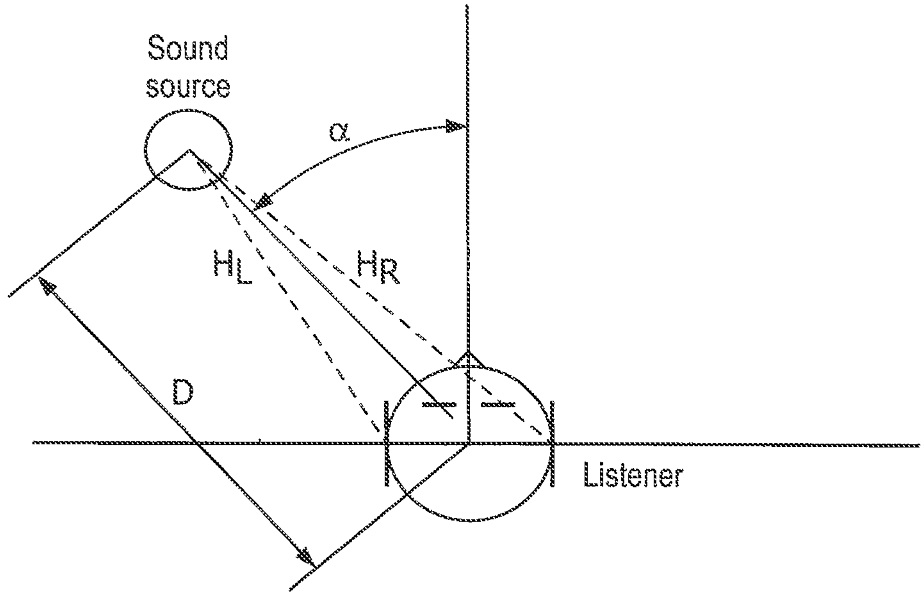
FIG. 6 illustrates an example of a sound source position relative to a user.

In the following, a specific example of the processing by the spatial processor 407 is described. In the example, the position of a sound source is defined relative to the listener by an azimuth angle α and a distance D, as shown in FIG. 6. A sound source positioned to the left of the listener corresponds to positive azimuth angles. The transfer function from the sound source position to the left ear is denoted by HL; the transfer function from the sound source position to the right ear by HR.

The transfer functions HL and HR are dependent on the azimuth angle α, the distance D and elevation ε □(not shown in FIG. 6). In a parametric representation, the transfer functions can be described as a set of three parameters per HRTF frequency sub band bh. This set of parameters includes an average level per frequency band for the left transfer function Pl(α,ε,D,bh), an average level per frequency band for the right transfer function Pr(α,ε,D,bh), an average phase difference per frequency band ϕ(α,ε,D,bh). A possible extension of this set is to include a coherence measure of the left and right transfer functions per HRTF frequency band ρ(α,ε,D,bh). These parameters can be stored in a database as a function of azimuth, elevation, distance and frequency band, and/or can be computed using some analytical function. For example, the Pl and Pr parameters could be stored as a function of azimuth and elevation, while the effect of distance is achieved by dividing these values by the distance itself (assuming a 1/D relationship between signal level and distance). In the following, the notation Pl(Lf) denotes the spatial parameter Pl corresponding to the sound source position of the Lf channel.

It should be noted that the number of frequency sub bands for HRTF parameterization ($b_h$) and the bandwidth of each sub band are not necessarily equal to the frequency resolution of the (QMF) filter bank (k) used by the spatial processor 407 or the spatial parameter resolution of the down-mix processor 403 and the associated parameter bands ($b_p$). For example, the QMF hybrid filter bank may have 71 channels, a HRTF may be parameterized in 28 frequency bands, and spatial encoding could be performed using 10 parameter bands. In such cases, a mapping from spatial and HRTF parameters to QMF hybrid index may be applied for example using a look-up table or an interpolation or averaging function. The following parameter indexes will be used in the description:

| Index | Description |
|---|---|
| bh | Parameter band index for HRTFs |
| bp | Parameter band index for multi-channel down-mix |
| k | QMF hybrid band index |

In the specific example, the spatial processor 407 divides the first stereo signal into suitable frequency sub bands by QMF filtering. For each sub band the sub band values $L_B$, $R_B$ are determined as:

$$\begin{bmatrix} L_B \\ R_B \end{bmatrix} = \begin{bmatrix} h_{11} & h_{12} \\ h_{21} & h_{22} \end{bmatrix} \begin{bmatrix} L_0 \\ R_0 \end{bmatrix},$$

where $L_O$, $R_O$ are the corresponding sub band values of the first stereo signal and the matrix values hj,k are parameters which are determined from HRTF parameters and the down-mix associated parametric data.

The matrix coefficients aim at reproducing the properties of the down-mix as if all individual channels were processed with HRTFs corresponding to the desired sound source position and they include the combined effect of decoding the multi-channel signal and performing an HRTF synthesis on this.

Specifically, and with reference to FIG. 5 and the description thereof, the matrix values can be determined as:

$$h_{11}=m_{11}H_L(L)+m_{21}H_L(R)+m_{31}H_L(C)$$

$$h_{11}=m_{12}H_L(L)+m_{22}H_L(R)+m_{32}H_L(C)$$

$$h_{21}=m_{11}H_R(L)+m_{21}H_R(R)+m_{31}H_R(C)$$

$$h_{22}=m_{12}H_R(L)+m_{22}H_R(R)+m_{32}H_R(C)$$

where mk,l are parameters determined in response to the parametric data generated by the TTT down-mixer 505.

Specifically the L, R and C signals are generated from the stereo down-mix signal L0, R0 according to:

$$\begin{bmatrix} L \\ R \\ C \end{bmatrix} = \begin{bmatrix} m_{11} & m_{12} \\ m_{21} & m_{22} \\ m_{31} & m_{32} \end{bmatrix} \begin{bmatrix} L_0 \\ R_0 \end{bmatrix},$$

where mk,l are dependent on two prediction coefficients c1 and c2, which are part of the transmitted spatial parameters:

$$\begin{bmatrix} m_{11} & m_{12} \\ m_{21} & m_{22} \\ m_{31} & m_{32} \end{bmatrix} = \frac{1}{3}\begin{bmatrix} c_1+2 & c_2-1 \\ c_1-1 & c_2+1 \\ 1-c_1 & 1-c_2 \end{bmatrix}$$

The values HJ(X) are determined in response to the HRTF parameter data for channel X to stereo output channel J of the second stereo signal as well as appropriate down-mix parameters.

Specifically, the HJ(X) parameters relate to the left (L) and right (R) down-mix signals generated by the two TTO down-mixers 501, 503 and may be determined in response to the HRTF parameter data for the two down-mixed channels. Specifically, a weighted combination of the HRTF parameters for the two individual left (Lf and Ls) or right (Rf and Rs) channels may be used. The individual parameters can be weighted by the relative energy of the individual signals. As a specific example, the following values may be determined for the left signal (L):

$$H_L(L) = \sqrt{w_{lf}^2 P_l^2(Lf) + w_{ls}^2 P_l^2(Ls)},$$

$$H_R(L) = e^{-j(w_{lf}^2\phi(lf)+w_{ls}^2\phi(ls))}\sqrt{w_{lf}^2 P_r^2(Lf) + w_{ls}^2 P_r^2(Ls)},$$

where the weights wx are given by:

$$w_{lf}^2 = \frac{10^{CLD_l/10}}{1+10^{CLD_l/10}},$$

$$w_{ls}^2 = \frac{1}{1+10^{CLD_l/10}},$$

and CLDl is the 'Channel Level Difference' between the left-front (Lf) and left-surround (Ls) defined in decibels (which is part of the spatial parameter bit stream):

$$CLD_l = 10\log_{10}\left(\frac{\sigma_{Lf}^2}{\sigma_{Ls}^2}\right),$$

with $\sigma_{lf}^2$ the power in a parameter sub band of the Lf channel, and $\sigma_{ls}^2$ the power in the corresponding sub band of the Ls channel.

Similarly, the following values can be determined for the right signal (R):

$$H_L(R) = e^{+j(w_{rf}^2\phi(rf)+w_{rs}^2\phi(rs))}\sqrt{w_{rf}^2 P_l^2(Rf) + w_{rs}^2 P_l^2(Rs)},$$

$$H_R(R) = \sqrt{w_{rf}^2 P_r^2(Rf) + w_{rs}^2 P_r^2(Rs)},$$

$$w_{rf}^2 = \frac{10^{CLD_r/10}}{1+10^{CLD_r/10}},$$

$$w_{rs}^2 = \frac{1}{1+10^{CLD_r/10}}.$$

and for the center (C) signal:

$$H_L(C)=P_l(C)e^{+j\phi(C)/2}$$

$$H_R(C)=P_r(C)e^{-j\phi(C)/2}$$

Thus, using the described approach, a low complexity spatial processing can allow a binaural virtual spatial signal to be generated based on the down-mixed multi-channel signal.

As mentioned, an advantage of the described approach is that the frequency sub bands of the associated down-mix parameters, the spatial processing by the spatial processor 407 and the HRTF parameters need not be the same. For example, a mapping between parameters of one sub band to the sub bands of the spatial processing may be performed. For example, if a spatial processing sub band covers a frequency interval corresponding to two HRTF parameter sub bands, the spatial processor 407 may simply apply (individual) processing on the HRTF parameter sub bands, using the same spatial parameter for all HRTF parameter sub bands that correspond to that spatial parameter.

In some embodiments, the encoder 309 can be arranged to include sound source position data which allows a decoder to identify the desired position data of one or more of the sound sources in the output stream. This allows the decoder to determine the HRTF parameters applied by the encoder 309 thereby allowing it to reverse the operation of the spatial processor 407. Additionally or alternatively, the encoder can be arranged to include at least some of the HRTF parameter data in the output stream.

Thus, optionally, the HRTF parameters and/or loudspeaker position data can be included in the output stream. This may for instance allow a dynamic update of the loudspeaker position data as a function of time (in the case of loudspeaker position transmission) or the use individualized HRTF data (in the case of HRTF parameter transmission).

In the case that HRTF parameters are transmitted as part of the bit stream, at least the Pl, Pr and ϕ parameters can be transmitted for each frequency band and for each sound source position. The magnitude parameters Pl, Pr can be quantized using a linear quantizer, or can be quantized in a logarithmic domain. The phase angles ϕ can be quantized linearly. Quantizer indexes can then be included in the bit stream.

Furthermore, the phase angles ϕ may be assumed to be zero for frequencies typically above 2.5 kHz, since (inter-aural) phase information is perceptually irrelevant for high frequencies.

After quantization, various loss less compression schemes may be applied to the HRTF parameter quantizer indices. For example, entropy coding may be applied, possibly in combination with differential coding across frequency bands. Alternatively, HRTF parameters may be represented as a difference with respect to a common or average HRTF parameter set. This holds especially for the magnitude parameters. Otherwise, the phase parameters can be approximated quite accurately by simply encoding the elevation and azimuth. By calculating the arrival time difference [typically the arrival time difference is practically frequency independent; it's mostly dependent on azimuth and elevation], given the trajectory difference to both ears, the corresponding phase parameters can be derived. In addition measurement differences can be encoded differentially to the predicted values based on the azimuth and elevation values.

Also lossy compression schemes may be applied, such as principle component decomposition, followed by transmission of the few most important PCA weights.

Figure 7:
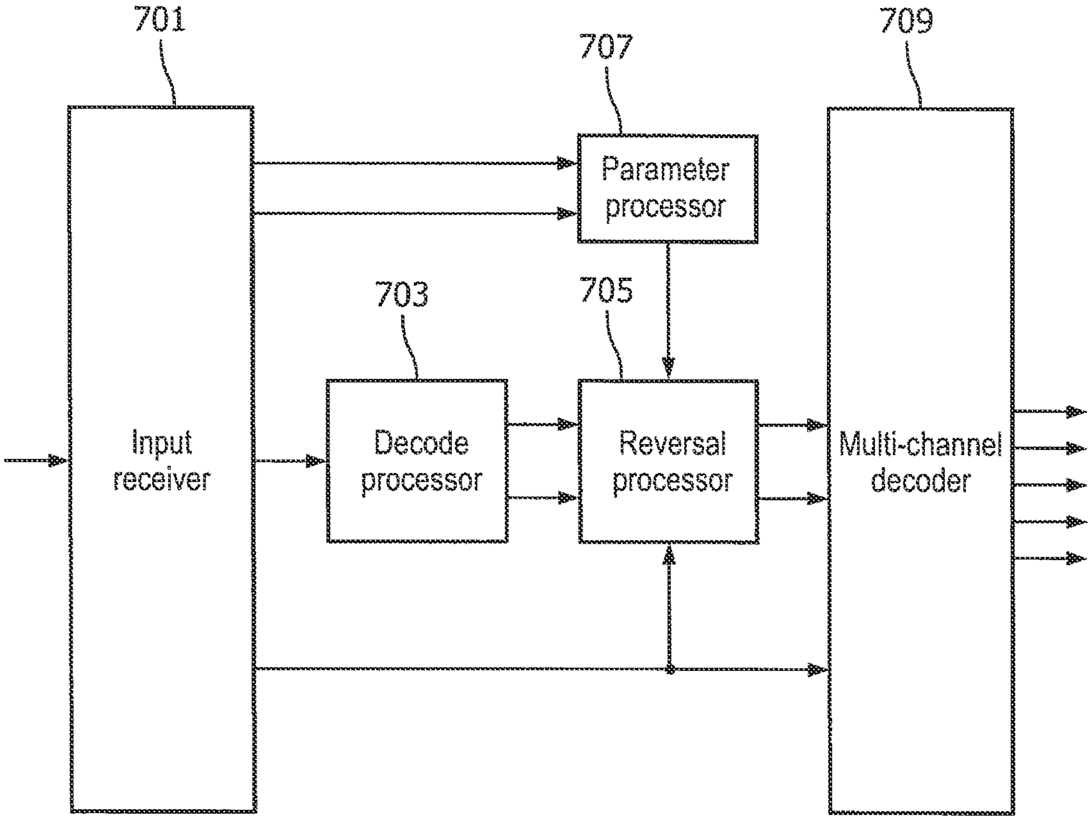
FIG. 7 illustrates a multi-channel decoder in accordance with some embodiments of the invention.

FIG. 7 illustrates an example of a multi-channel decoder in accordance with some embodiments of the invention. The decoder may specifically be the decoder 315 of FIG. 3.

The decoder 315 comprises an input receiver 701 which receives the output stream from the encoder 309. The input receiver 701 de-multiplexes the received data stream and provides the relevant data to the appropriate functional elements.

The input receiver 701 is coupled to a decode processor 703 which is fed the encoded data of the second stereo signal. The decode processor 703 decodes this data to generate the binaural virtual spatial signal produced by the spatial processor 407.

The decode processor 703 is coupled to a reversal processor 705 which is arranged to reverse the operation performed by the spatial processor 407. Thus, the reversal processor 705 generates the down-mixed stereo signal produced by the down-mix processor 403.

Specifically, the reversal processor 705 generates the down-mix stereo signal by applying a matrix multiplication to the sub band values of the received binaural virtual spatial signal. The matrix multiplication is by a matrix corresponding to the inverse matrix of that used by the spatial processor 407 thereby reversing this operation:

$$\begin{bmatrix} L_0 \\ R_0 \end{bmatrix} = \begin{bmatrix} h_{11} & h_{12} \\ h_{21} & h_{22} \end{bmatrix}^{-1} \begin{bmatrix} L_B \\ R_B \end{bmatrix}$$

This matrix multiplication can also be described as:

$$\begin{bmatrix} L_0 \\ R_0 \end{bmatrix} = \begin{bmatrix} q_{11} & q_{12} \\ q_{21} & q_{22} \end{bmatrix} \begin{bmatrix} L_B \\ R_B \end{bmatrix}.$$

The matrix coefficients $q_{k,l}$ are determined from the parametric data associated with the down-mix signal (and received in the data stream from the decoder 309) as well as HRTF parameter data. Specifically, the approach described with reference to the encoder 309 may also be used by the decoder 409 to generate the matrix coefficients hxy. The matrix coefficients qxy can then be found by a standard matrix inversion.

The reversal processor 705 is coupled to a parameter processor 707 which determines the HRTF parameter data to be used. The HRTF parameters may in some embodiments be included in the received data stream and may simply be extracted there from. In other embodiments, different HRTF parameters may for example be stored in a database for different sound source positions and the parameter processor 707 may determine the HRTF parameters by extracting the values corresponding to the desired signal source position. In some embodiments, the desired signal source position(s) can be included in the data stream from the encoder 309. The parameter processor 707 can extract this information and use it to determine the HRTF parameters. For example, it may retrieve the HRTF parameters stored for the indication sound source position(s).

In some embodiments, the stereo signal generated by the reversal processor may be output directly. However, in other embodiments, it may be fed to a multi-channel decoder 709 which can generate the M-channel signal from the down-mix stereo signal and the received parametric data.

In the example, the inversion of the 3D binaural synthesis is performed in the subband domain, such as in QMF or Fourier frequency subbands. Thus, the decode processor 703 may comprise a QMF filter bank or Fast Fourier Transform (FFT) for generating the subband samples fed to the reversal processor 705. Similarly, the reversal processor 705 or the multi-channel decoder 709 may comprise an inverse FFT or QMF filter bank for converting the signals back to the time domain.

The generation of a 3D binaural signal at the encoder side allows for spatial listening experiences to be provided to a headset user by a conventional stereo encoder. Thus, the described approach has the advantage that legacy stereo devices can reproduce a 3D binaural signal. As such, in order to reproduce 3D binaural signals, no additional post-processing needs to be applied resulting in a low complexity solution.

However, in such an approach, a generalized HRTF is typically used which may in some cases lead to a suboptimal spatial generation in comparison to a generation of the 3D binaural signal at the decoded using dedicated HRTF data optimized for the specific user.

Specifically, a limited perception of distance and possible sound source localization errors can sometimes originate from the use of non-individualized HRTFs (such as impulse responses measured for a dummy head or another person). In principle, HRTFs differ from person to person due to differences in anatomical geometry of the human body. Optimum results in terms of correct sound source localization can therefore best be achieved with individualized HRTF data.

In some embodiments, the decoder 315 furthermore comprises functionality for first reversing the spatial processing of the encoder 309 followed by a generation of a 3D binaural signal using local HRTF data and specifically using individual HRTF data optimized for the specific user. Thus, in this embodiment, the decoder 315 generates a pair of binaural output channels by modifying the down-mixed stereo signal using the associated parametric data and HRTF parameter data which is different than the (HRTF) data used at the encoder 309. Hence, in this approach provides a combination of encoder-side 3D synthesis, decoder-side inversion, followed by another stage of decoder-side 3D synthesis.

An advantage of such an approach is that legacy stereo devices will have 3D binaural signals as output providing a basic 3D quality, while enhanced decoders have the option to use personalized HRTFs enabling an improved 3D quality. Thus, both legacy compatible 3D synthesis as well as high quality dedicated 3D synthesis is enabled in the same audio system.

Figure 8:
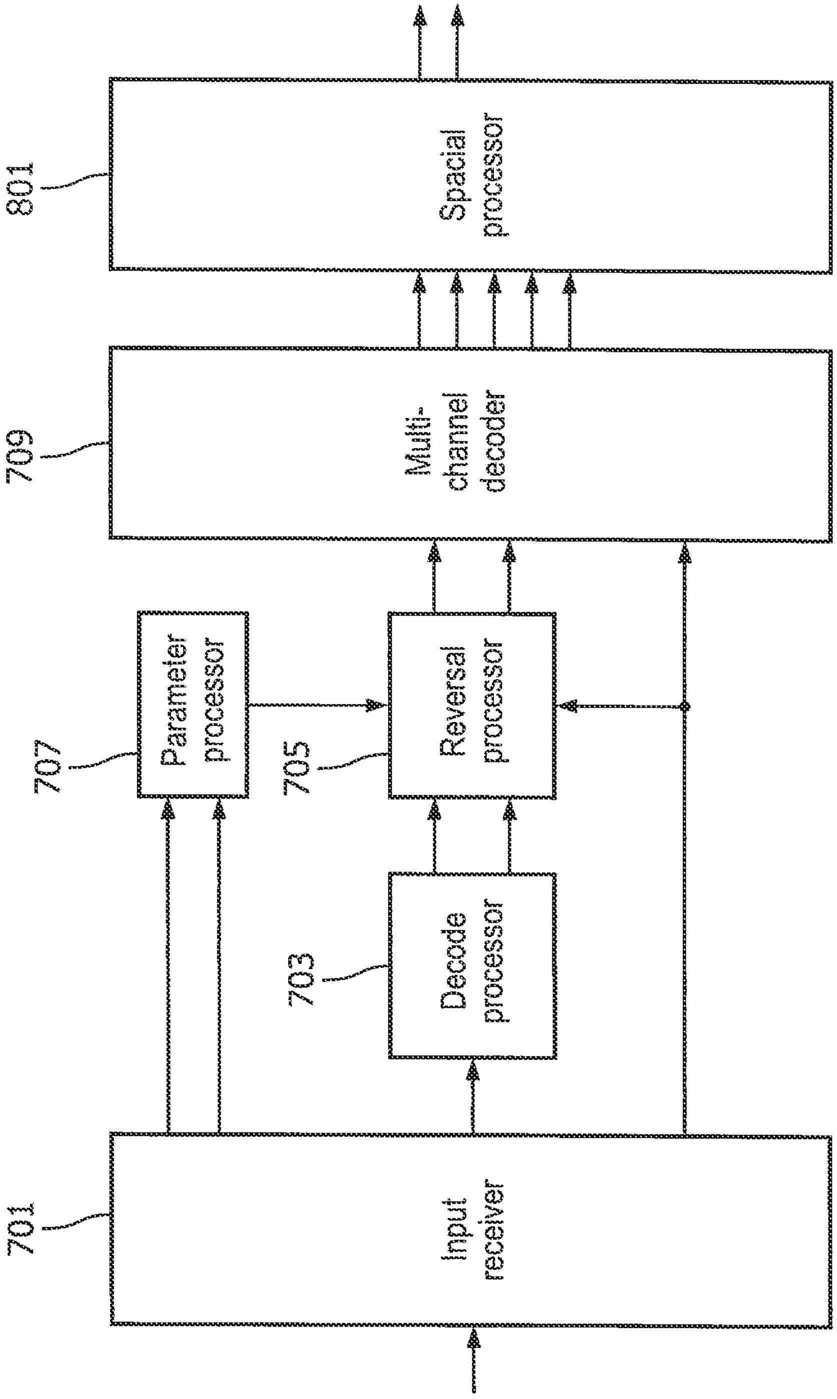
FIG. 8 illustrates a decoder in accordance with some embodiments of the invention.

A simple example of such a system is illustrated in FIG. 8 which shows how an additional spatial processor 801 can be added to the decoder of FIG. 7 to provide a customized 3D binaural output signal. In some embodiments, the spatial processor 801 may simply provide a simple straightforward 3D binaural synthesis using individual HRTF functions for each of the audio channels. Thus, the decoder can recreate the original multi-channel signal and convert this into a 3D binaural signal using customized HRTF filtering.

In other embodiments, the inversion of the encoder synthesis and the decoder synthesis may be combined to provide a lower complexity operation. Specifically, the individualized HRTFs used for the decoder synthesis can be parameterized and combined with the (inverse of) the parameters used by the encoder 3D synthesis.

More specifically, as previously described, the encoder synthesis involves multiplying stereo subband samples of the down-mixed signals by a 2×2 matrix:

$$\begin{bmatrix} L_B \\ R_B \end{bmatrix} = \begin{bmatrix} h_{11} & h_{12} \\ h_{21} & h_{22} \end{bmatrix} \begin{bmatrix} L_0 \\ R_0 \end{bmatrix}$$

where LO, RO are the corresponding sub band values of the down-mixed stereo signal and the matrix values hj,k are parameters which are determined from HRTF parameters and the down-mix associated parametric data as previously described.

The inversion performed by the reversal processor 705 can then be given by:

$$\begin{bmatrix} L_0 \\ R_0 \end{bmatrix} = \begin{bmatrix} h_{11} & h_{12} \\ h_{21} & h_{22} \end{bmatrix}^{-1} \begin{bmatrix} L_B \\ R_B \end{bmatrix}$$

where LB, RB are the corresponding sub band values of the decoder down-mixed stereo signal.

To ensure an appropriate decoder-side inversion process, the HRTF parameters used in the encoder to generate the 3D binaural signal, and the HRTF parameters used to invert the 3D binaural processing are identical or sufficiently similar. Since one bit stream will generally serve several decoders, personalization of the 3D binaural down mix is difficult to obtain by encoder synthesis.

However, since the 3D binaural synthesis process is invertible the reversal processor 705 regenerates the down-mixed stereo signal which is then used to generate a 3D binaural signal based on individualized HRTFs.

Specifically, in analogy to the operation at the encoder 309, the 3D binaural synthesis at the decoder 315 can be generated by a simple, subband wise 2×2 matrix operation on the down-mix signal $L_O$, $R_O$ to generate the 3D binaural signal $L_{B'}$, $R_{B'}$:

$$\begin{bmatrix} L_{B'} \\ R_{B'} \end{bmatrix} = \begin{bmatrix} p_{11} & p_{12} \\ p_{21} & p_{22} \end{bmatrix} \begin{bmatrix} L_O \\ R_O \end{bmatrix}$$

where the parameters px,y are determined based on the individualized HRTFs in the same way as hx,y are generated by the encoder 309 based on the general HRTF. Specifically, in the decoder 309, the parameters hx,y are determined from the multi-channel parametric data and the general HRTFs. As the multi-channel parametric data is transmitted to the decoder 315, the same approach can be used by this to calculate px,y based on the individual HRTF.

Combining this with the operation of reversal processor 705

$$\begin{bmatrix} L_{B'} \\ R_{B'} \end{bmatrix} = \begin{bmatrix} p_{11} & p_{12} \\ p_{21} & p_{22} \end{bmatrix} \begin{bmatrix} h_{11} & h_{12} \\ h_{21} & h_{22} \end{bmatrix}^{-1} \begin{bmatrix} L_B \\ R_B \end{bmatrix} = \begin{bmatrix} a_{11} & a_{12} \\ a_{21} & a_{22} \end{bmatrix} \begin{bmatrix} L_B \\ R_B \end{bmatrix}$$

In this equation, the matrix entries hx,y, are obtained using the general non-individualized HRTF set used in the encoder, while the matrix entries px,y are obtained using a different and preferably personalized HRTF set. Hence the 3D binaural input signal $L_B$, $R_B$ generated using non-individualized HRTF data is transformed to an alternative 3D binaural output signal $L_{B'}$, $R_{B'}$ using different personalized HRTF data.

Furthermore, as illustrated, the combined approach of the inversion of the encoder synthesis and the decoder synthesis can be achieved by a simple 2×2 matrix operation. Hence the computational complexity of this combined process is virtually the same as for a simple 3D binaural inversion.

Figure 9:
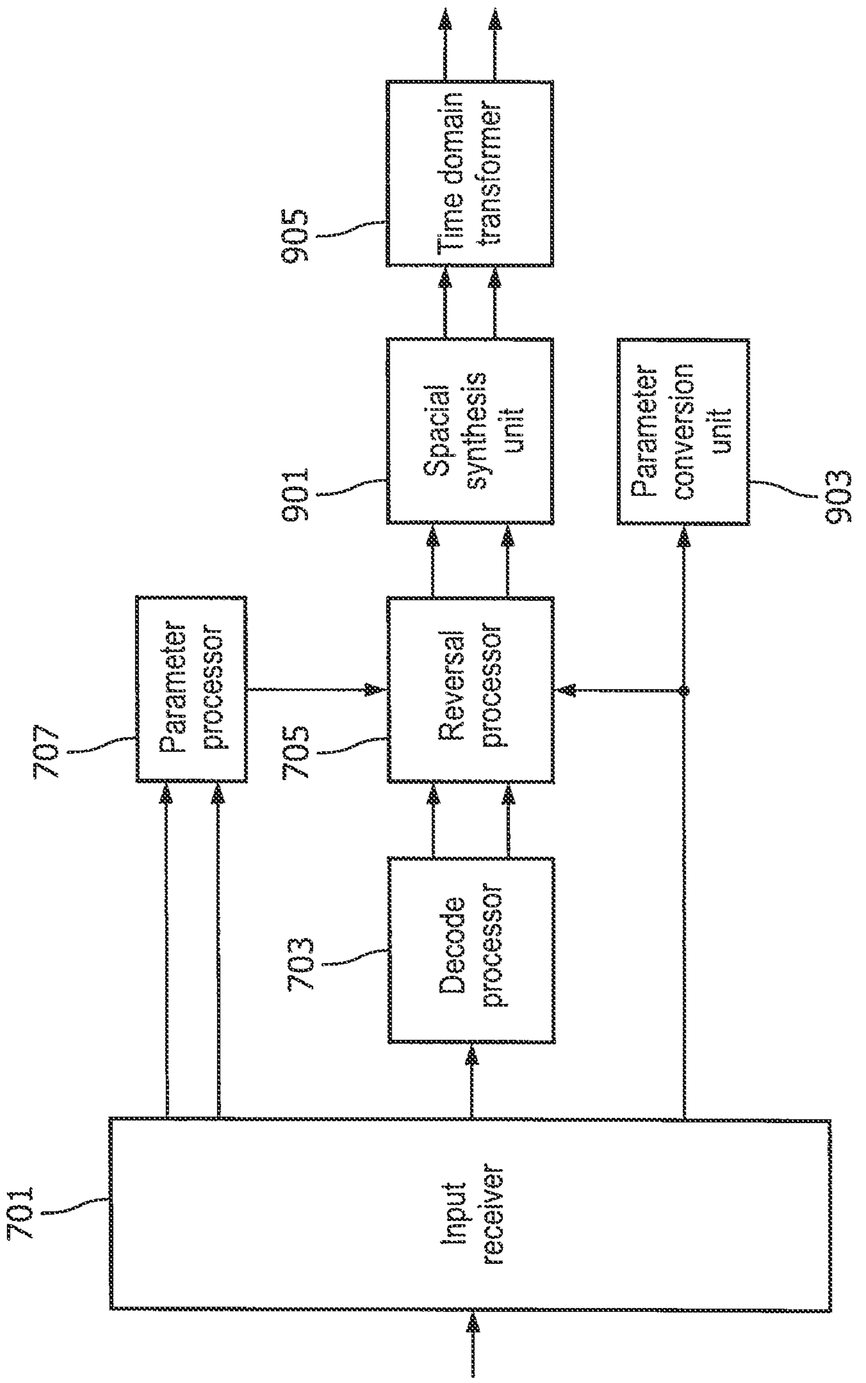
FIG. 9 illustrates a decoder in accordance with some embodiments of the invention.

FIG. 9 illustrates an example of the decoder 315 operating in accordance with the above described principles. Specifically, the stereo subband samples of the 3D binaural stereo downmix from the encoder 309 is fed to the reversal processor 705 which regenerates the original stereo downmix samples by a 2×2 matrix operation.

$$\begin{bmatrix} L_0 \\ R_0 \end{bmatrix} = \begin{bmatrix} h_{11} & h_{12} \\ h_{21} & h_{22} \end{bmatrix}^{-1} \begin{bmatrix} L_B \\ R_B \end{bmatrix}$$

The resulting subband samples are fed to a spatial synthesis unit 901 which generates an individualized 3D binaural signal by multiplying these samples by a 2×2 matrix.

$$\begin{bmatrix} L_{B'} \\ R_{B'} \end{bmatrix} = \begin{bmatrix} p_{11} & p_{12} \\ p_{21} & p_{22} \end{bmatrix} \begin{bmatrix} L_O \\ R_O \end{bmatrix}$$

The matrix coefficients are generated by a parameter conversion unit (903) which generates the parameters based on the individualized HRTF and the multi-channel extension data received from the encoder 309.

The synthesis subband samples LB', RB' are fed to a subband to time domain transform 905 which generates the 3D binaural time domain signals that can be provided to a user.

Although FIG. 9 illustrates the steps of 3D inversion based on non-individualized HRTFs and 3D synthesis based on individualized HRTFs as sequential operations by different functional units, it will be appreciated that in many embodiments these operations are applied simultaneously by a single matrix application. Specifically, the 2×2 matrix $$\begin{bmatrix} a_{11} & a_{12} \\ a_{21} & a_{22} \end{bmatrix} = \begin{bmatrix} p_{11} & p_{12} \\ p_{21} & p_{22} \end{bmatrix} \begin{bmatrix} h_{11} & h_{12} \\ h_{21} & h_{22} \end{bmatrix}^{-1}$$

is calculated and the output samples are calculated as $$\begin{bmatrix} L_{B'} \\ R_{B'} \end{bmatrix} = \begin{bmatrix} a_{11} & a_{12} \\ a_{21} & a_{22} \end{bmatrix} \begin{bmatrix} L_B \\ R_B \end{bmatrix}$$

It will be appreciated that the described system provides a number of advantages including:

No or little (perceptual) quality degradation of the multi-channel reconstruction as the spatial stereo processing can be reversed at multi-channel decoders.

A (3D) spatial binaural stereo experience can be provided even by conventional stereo decoders.

Reduced complexity compared to existing spatial positioning methods. The complexity is reduced in a number of ways:

Efficient storage of HRTF parameters. Instead of storing HRTF impulse responses, only a limited number of parameters are used to characterize the HRTFs.

Efficient 3D processing. Since HRTFs are characterized as parameters at a limited frequency resolution, and the application of HRTF parameters is performed in the (highly down-sampled) parameter domain, the spatial synthesis stage is more efficient than conventional synthesis methods based on full HRTF convolution.

The required processing can be performed in e.g. the QMF domain, resulting in a smaller computational and memory load than FFT-based methods.

Efficient re-use of existing surround sound building blocks (such as standard MPEG surround sound encoding/decoding functionalities) allowing minimum implementation complexity.

Possibility of personalization by modification of the (parameterized) HRTF data transmitted by the encoder.

Sound source positions can change on the fly by transmitted position information.

Figure 10:
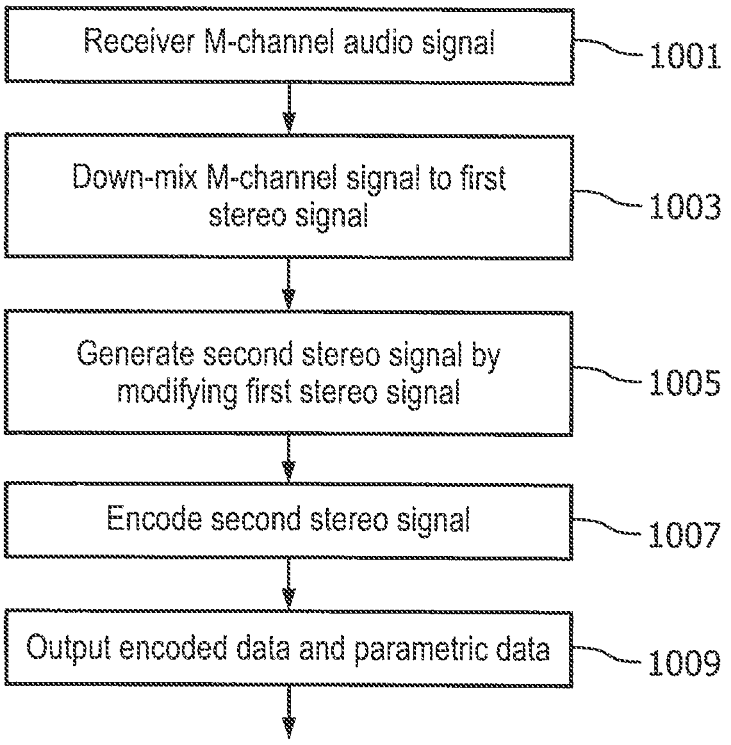
FIG. 10 illustrates a method of audio encoding in accordance with some embodiments of the invention.

FIG. 10 illustrates a method of audio encoding in accordance with some embodiments of the invention.

The method initiates in step 1001 wherein an M-channel audio signal is received (M>2).

Step 1001 is followed by step 1003 wherein the M-channel audio signal is down-mixed to a first stereo signal and associated parametric data.

Step 1003 is followed by step 1005 wherein the first stereo signal is modified to generate a second stereo signal in response to the associated parametric data and spatial Head Related Transfer Function (HRTF) parameter data. The second stereo signal is a binaural virtual spatial signal.

Step 1005 is followed by step 1007 wherein the second stereo signal is encoded to generate encoded data.

Step 1007 is followed by step 1009 wherein an output data stream comprising the encoded data and the associated parametric data is generated.

Figure 11:
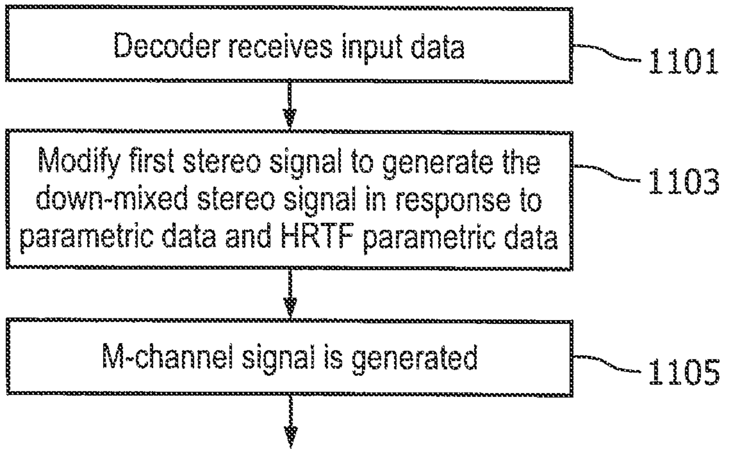
FIG. 11 illustrates a method of audio decoding in accordance with some embodiments of the invention.

FIG. 11 illustrates a method of audio decoding in accordance with some embodiments of the invention.

The method initiates in step 1101 wherein a decoder receives input data comprising a first stereo signal and parametric data associated with a down-mixed stereo signal of an M-channel audio signal, where M>2. The first stereo signal is a binaural virtual spatial signal.

Step 1101 is followed by step 1103 wherein the first stereo signal is modified to generate the down-mixed stereo signal in response to the parametric data and spatial Head Related Transfer Function (HRTF) parameter data associated with the first stereo signal.

Step 1103 is followed by optional step 1105 wherein the M-channel audio signal is generated in response to the down-mixed stereo signal and the parametric data.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality. Reference signs in the claims are provided merely as a clarifying example shall not be construed as limiting the scope of the claims in any way.

What is claimed is:

1. An audio decoder, comprising:

a receiver circuit, wherein the receiver circuit is configured to receive a three-dimensional binaural signal and down-mixed associated parametric data, wherein the down-mixed associated parametric data is associated with a down-mixed stereo signal of a plurality of audio signals of a corresponding plurality of audio channels, wherein the audio channels are spatially diverse, and wherein the three-dimensional binaural signal emulates one sound source position in three dimensions for each of the plurality of audio channels; and a processor circuit, wherein the processor circuit is configured to generate the down-mixed stereo signal by applying a reverse binaural perceptual transfer function and the down-mixed associated parametric data to the received three-dimensional binaural signal, and wherein the processor circuit is configured to generate the plurality of audio signals in response to the down-mixed stereo signal and the down-mixed associated parametric data, wherein the processor circuit is configured to receive sound source position data, wherein the processor circuit is configured to determine first spatial parameter data in response to the sound source position data, and wherein the decoder further comprises a spatial decoder circuit, wherein the spatial decoder circuit is configured to produce a pair of binaural output channels by modifying the three-dimensional binaural signal in response to the down-mixed associated parametric data and in response to second spatial parameter data associated with a second binaural perceptual transfer function, wherein the second spatial parameter data is different than the first spatial parameter data.

2. The decoder of claim 1, wherein the spatial decoder circuit comprises:

a parameter converter circuit, wherein the parameter converter circuit is configured to convert the downmixed associated parametric data into binaural synthesis parameters using the second spatial parameter data; and a spatial synthesizer circuit, wherein the spatial synthesizer circuit is configured to synthesize the pair of binaural output channels using the binaural synthesis parameters and the received three-dimensional binaural signal.

* * * * *